US012234059B2

(12) United States Patent
Zhao et al.

(10) Patent No.: US 12,234,059 B2
(45) Date of Patent: Feb. 25, 2025

(54) METHOD OF FORMING A PAPER CONTAINER AND RELATED MATERIALS

(71) Applicant: DART CONTAINER CORPORATION, Mason, MI (US)

(72) Inventors: Mingyang Zhao, Kansas City, MO (US); Daniel Peter Martin, Midland, MI (US); Samuel Eric DeFreese, Lansing, MI (US)

(73) Assignee: Dart Container Corporation, Mason, MI (US)

( * ) Notice: Subject to any disclaimer, the term of this patent is extended or adjusted under 35 U.S.C. 154(b) by 0 days.

(21) Appl. No.: 17/494,430

(22) Filed: Oct. 5, 2021

(65) Prior Publication Data

US 2022/0111995 A1 Apr. 14, 2022

Related U.S. Application Data

(60) Provisional application No. 63/089,336, filed on Oct. 8, 2020.

(51) Int. Cl.
*B65D 3/06* (2006.01)
*B31B 50/16* (2017.01)
(Continued)

(52) U.S. Cl.
CPC ................ *B65D 3/06* (2013.01); *B31B 50/16* (2017.08); *B31B 50/64* (2017.08); *B31B 50/747* (2017.08);
(Continued)

(58) Field of Classification Search
CPC ... B65D 3/06; B65D 3/12; B65D 3/14; B65D 65/42; B65D 25/14; B65D 3/04; B65D 3/08; B65D 3/22; B65D 3/28; B65D 5/748; B65D 81/3865; B65D 65/466; B65D 85/816; D21H 19/72; D21H 19/80; B32B 27/10; B32B 2250/44; B32B 2439/70; B32B 27/32; B32B 15/12; B32B 15/085;
(Continued)

(56) References Cited

U.S. PATENT DOCUMENTS

| | | | |
|---|---|---|---|
| 4,058,645 | A | 11/1977 | Steiner |
| 5,308,890 | A | 5/1994 | Snyder |

(Continued)

FOREIGN PATENT DOCUMENTS

| | | | |
|---|---|---|---|
| CA | 2829711 | A1 | 10/2012 |
| CN | 111379194 | A | 7/2020 |

(Continued)

OTHER PUBLICATIONS

European Patent Office, Extended European Search Report re Corresponding Application No. 21201155.5-1016, Feb. 25, 2022, 6 pages, Munich, Germany.

*Primary Examiner* — Christopher R Demeree
(74) *Attorney, Agent, or Firm* — McGarry Bair PC

(57) ABSTRACT

Materials for coating paper sleeve blanks are provided, wherein the paper sleeve blank includes a multilayer coating. The multilayer coating includes a barrier layer and a top coat. At least two polymeric layers, including a top coat, are added to one side of the paper sleeve blank and the bottom blank. A container forming machine wraps and seals the multilayer coated paper sleeve blank to the coated bottom blank.

53 Claims, 9 Drawing Sheets

(51) Int. Cl.

| | |
|---|---|
| ***B31B 50/64*** | (2017.01) |
| ***B31B 50/74*** | (2017.01) |
| ***B31B 50/88*** | (2017.01) |
| ***B31B 110/10*** | (2017.01) |
| ***B31B 120/00*** | (2017.01) |
| ***B65D 3/12*** | (2006.01) |
| ***B65D 3/14*** | (2006.01) |
| ***B65D 65/42*** | (2006.01) |
| ***D21H 19/20*** | (2006.01) |
| ***D21H 19/82*** | (2006.01) |

(52) U.S. Cl.
CPC ................ *B31B 50/88* (2017.08); *B65D 3/12* (2013.01); *B65D 3/14* (2013.01); *B65D 65/42* (2013.01); *D21H 19/20* (2013.01); *D21H 19/824* (2013.01); *B31B 2110/10* (2017.08); *B31B 2120/002* (2017.08)

(58) Field of Classification Search
CPC .... B32B 2307/7246; B32B 2307/7242; B32B 2307/73; B32B 2317/12; B32B 27/308; B31B 50/747; Y02P 20/582; Y02W 90/10; Y10T 428/1303; Y10T 428/1352
USPC .......... 229/400, 5.85, 4.5; 428/349; 493/128
See application file for complete search history.

(56) References Cited

U.S. PATENT DOCUMENTS

| | | | | |
|---|---|---|---|---|
| 5,349,025 | A | 9/1994 | Siol et al. | |
| 5,654,039 | A | 8/1997 | Wenzel et al. | |
| 5,800,873 | A | 9/1998 | Enthoven et al. | |
| 10,155,878 | B2 | 12/2018 | Hermes et al. | |
| 10,612,193 | B2 | 4/2020 | Katzenstein et al. | |
| 10,889,938 | B2 * | 1/2021 | Constant | B65D 3/06 |
| 2003/0152724 | A1 | 8/2003 | Swoboda et al. | |
| 2006/0286325 | A1 * | 12/2006 | Swoboda | B32B 5/18 428/36.5 |
| 2010/0012712 | A1 | 1/2010 | Swoboda et al. | |
| 2019/0077537 | A1 | 3/2019 | Fortin et al. | |
| 2019/0160776 | A1 * | 5/2019 | Olcese | B41M 3/006 |
| 2019/0257034 | A1 | 8/2019 | Pang et al. | |
| 2019/0329929 | A1 | 10/2019 | Pang et al. | |
| 2020/0232164 | A1 | 7/2020 | Parker et al. | |
| 2020/0263359 | A1 | 8/2020 | Zha et al. | |
| 2021/0285157 | A1 * | 9/2021 | Choi | B65D 65/466 |
| 2022/0033158 | A1 * | 2/2022 | Boswell | B32B 27/10 |
| 2022/0111995 | A1 * | 4/2022 | Zhao | B31B 50/88 |
| 2022/0112664 | A1 * | 4/2022 | Boswell | D21H 19/12 |

FOREIGN PATENT DOCUMENTS

| | | | |
|---|---|---|---|
| EP | 1010807 | B1 | 10/2005 |
| EP | 2719825 | A1 | 4/2014 |
| EP | 2691428 | B1 | 1/2019 |
| JP | 2001355195 | A | 12/2001 |
| KR | 101089765 | B1 | 12/2011 |
| WO | 2011017388 | A2 | 2/2011 |
| WO | 2012064478 | A1 | 5/2012 |
| WO | 2019094805 | A1 | 5/2019 |
| WO | 2019099787 | A1 | 5/2019 |

* cited by examiner

METHOD OF FORMING A PAPER CONTAINER AND RELATED MATERIALS

CROSS-REFERENCE TO RELATED APPLICATIONS

This application claims the benefit of U.S. Provisional Patent Application No. 63/089,336, filed on Oct. 8, 2020, which is incorporated herein by reference in its entirety.

BACKGROUND

Conventional cups can be formed as two-piece paper containers. For example, a conventional wax paper cup is made using a paper web that includes a printed graphic on one side and a wax coating that is applied after the cup is formed. The paper web is supplied to a cup forming machine where the sleeve blanks are cut from the paper web and a liquid glue is applied along two edges. The sleeve blank is then wrapped around a forming mandrel and a side seam clamp is used to apply pressure to seal the overlapping edges of the wrapped blank with the liquid glue to form the sleeve.

BRIEF DESCRIPTION

Aspects of the present disclosure relate to cups and portions thereof including coating materials, processes, and assembly of paper sleeve blanks and bottom blanks. The paper sleeve blank and bottom blank include coatings with both conventional homogenous and core-shell emulsion particles. These two types of emulsions can be applied in separate coating layers or combined in a single layer. These coating layers are applied to sidewall paper stock on the side facing the inside of the cup and on both sides of the bottom stock material. A container forming machine wraps and seals the coated paper sleeve blank to the coated bottom blank.

In one aspect, the disclosure relates to a paper container comprising a paper sleeve having an inner surface and an outer surface and comprising overlapping side edges defining a sidewall seam, a top portion defining top opening, a bottom portion defining a bottom opening, and a side wall portion extending between the top portion and the bottom portion, a paper bottom, affixed to the bottom portion and closing the bottom opening, and having an inner surface and an outer surface, and a multi-layer, styrene-free, acrylic coating applied to the inner surface of at least the paper sleeve comprising a barrier layer confronting the inner surface of at least the paper sleeve, and a top coat confronting the barrier layer.

In another aspect, the disclosure relates to a paper container comprising a paper sleeve having an inner surface and an outer surface and comprising overlapping side edges defining a sidewall seam, a top portion defining top opening, a bottom portion defining a bottom opening, and a side wall portion extending between the top portion and the bottom portion, a paper bottom, affixed to the bottom portion and closing the bottom opening, and having an inner surface and an outer surface, a first multi-layer, styrene-free, acrylic coating applied to the inner surface of the paper sleeve to form a first barrier layer, a second multi-layer, styrene-free, acrylic coating applied to the inner surface of the paper bottom to form a second barrier layer, wherein the first and second multi-layer, styrene-free, acrylic coatings have different layers.

In yet another aspect, the disclosure relates to a method of making a paper container comprising wrapping a paper sleeve blank around a paper bottom blank, to form a bottom seam between the paper sleeve blank and the paper bottom blank, and overlapping side edges of the paper sleeve blank to form a sidewall seam, with an inner surface of the paper bottom blank having a first multi-layer, styrene-free, acrylic coating, and both an inner surface and outer surface of the paper bottom blank having a second multi-layer, styrene-free, acrylic coating on an inner surface of the paper bottom, and applying at least pressure to at least the sidewall seam without the addition of an adhesive separate from the first multi-layer, styrene-free, acrylic coating to bond the overlapping side edges at the sidewall seam.

DETAILED DESCRIPTION

Figure 1:
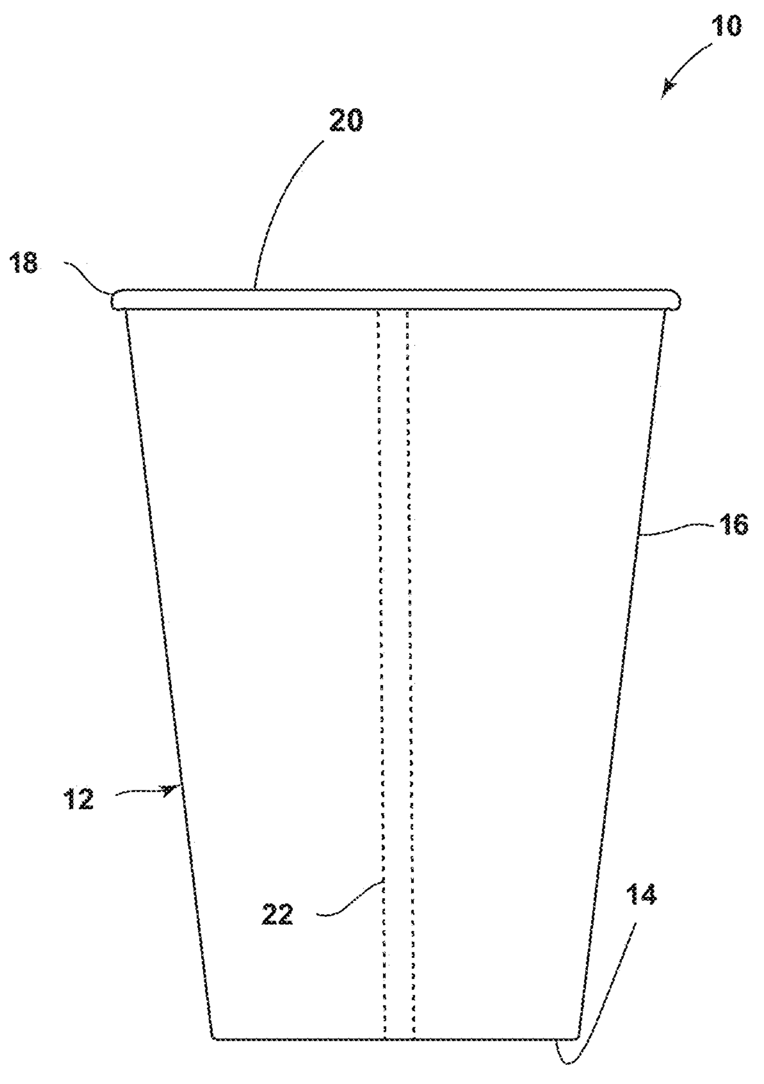
FIG. 1 is a schematic front view of a container according to an aspect of the disclosure.

Aspects of the present disclosure relate to materials for coating paper to provide a container with barrier layer, heat-sealing, anti-fracture, and/or anti-block properties. By way of non-limiting example, the coated paper can be used to form a two-piece paper container made by wrapping a paper sleeve blank around a paper bottom blank using current container forming machines. An alternative to wrapping the sleeve blank around the bottom blank is to first form the sleeve and then join the bottom blank to the sleeve blank. For example, the sleeve can be formed first and the bottom blank be moved into the formed sleeve. While aspects of the present disclosure are discussed in the context of a cup, additional container types, such as bowls and storage containers, including those suitable for use in food service, are also contemplated.

Two-piece paper containers can be made by cutting a sleeve blank and a bottom blank from suitable paper substrates, also referred to as a paper web. The sleeve blank and bottom blank are assembled by a container forming machine to form the container defining a cavity for holding material. The container forming machine generally includes a mandrel about which the sleeve blank is wrapped and overlapping side edges of the sleeve blank are heated or pressed such that the coatings on the side edges adhere together to form a sleeve. A bottom edge of the sleeve is similarly heat-sealed to the bottom blank to seal the sleeve with the bottom blank and thus form the container. Thus, the process of forming the two-piece paper container involves the use of heat both in forming the sleeve and in sealing the sleeve with the bottom blank.

Two-piece paper containers made from paper stock can be coated with a polymer such as a polyethylene- or styrene-acrylic-based coating. These polymeric coatings act as a barrier coating that provides protection to the paper from the contents of the container (e.g. liquids, grease). Conventionally, paper cups were provided with a wax or polyethylene-based barrier coating which protects the paper from water contained within the cup. Some of the barrier coatings, such as extruded polyethylene-based based coatings, also function as an adhesive for forming the sidewall seam of the sleeve and sealing the sleeve with the bottom. Once the cup is otherwise fully formed; a wax coating is applied to the cup. Paper cups made using a paper web that includes a polyethylene-based coating, rather than a wax, do not require the step of applying a liquid glue at the cup forming machine because the polyethylene-based coating can function as the adhesive. The polyethylene-based coating can be softened with heat and applied with pressure to provide sufficient adhesion for forming the side seam of the sleeve and sealing the sleeve with the bottom blank without the application of an additional glue. Removal of the glue application station from the cup forming machine can allow the cups to be formed at a higher rate. However, in some cases, the use of a polyethylene-based coating on the paper web is not desirable. For example, cups made from paper that includes a polyethylene-based coating can be challenging to recycle.

Like polyethylene-based coating, a styrene-acrylic coating is also heat-sealable and thus can also function as the adhesive for securing the overlapping side edges of the sleeve blank and sealing the sleeve with the bottom blank at the container forming machine. The container forming machine is configured to apply heat and/or pressure at specific locations of the sleeve and bottom blanks to form an adhesive seal with the polyethylene- or styrene-based coating that provides an adhesive sidewall seam, also referred to as a seam seal or a sidewall seal, where the side edges of the sleeve blank overlap and to form a bottom seal between the sleeve and the bottom blank. Containers that are made using paper stock that include a styrene-acrylic based coating are less preferred by customers, however, due to the negative perception of styrene as a sustainable material.

Some coating methods using a dispersion can result in undesirable properties such as surface tackiness. Anti-block additives can be used to reduce the tackiness, but they significantly weaken the heat-sealing properties of these coatings, and additives that are needed to lower the $T_g$ (glass transition temperature) of the coating can reduce the resistance to blocking. For example, when an aqueous coating is used to coat paper stock and blocking occurs, the coated paper stock stored in a roll can become solidified into a single mass making it impossible to unroll and thus unusable for container forming. Anti-block additives can be included in such an aqueous coating formulation to prevent such blocking from occurring; however, these additives often impair the heat seal properties of the coating, which can lead to inadequate sealing at the cup seam seals. Thus, it is desirable to find an aqueous coating or additive that effectively prevents blocking and yet achieves effective heat seals.

Furthermore, most dispersion coatings have significant challenges with brittleness. For example, when the bottom stock is shaped and folded with pleats for the seal of the bottom blank to the sidewall, the coatings on the bottom blank fracture, which can compromise the seal, causing liquids in the container to leak through. Additional heating stations to soften the coating after the sleeve is joined to the bottom blank can be used to reduce fracturing by allowing the coating to flow and fill in the fractures, but this added step can limit the production rate, which is typically between 300 to 330 cups per minute, and can increase cost of production.

Aspects of the present disclosure include materials and compositions of coating layers in single or multilayer coatings on the sleeve blank and/or on the bottom blank, including, without limitation, that one or both sides of the bottom blank can be coated. The various coatings include a barrier layer that can itself comprise multiple layers, and a top coat that has heat-sealing, anti-fracture, and block resistant properties, or these attributes could be achieved through a single coat with a formulation containing multiple emulsions with additives. It will be understood that the term multilayer coating can refer to a single layer of a multifunctional coating.

A remainder of the application will be described with respect to a cup; however, it will be understood that any number of uses for the coatings has been contemplated including that the coatings can be utilized on any type of container, including food service containers. Further, while aspects of the present disclosure are discussed in the context of the cup, the container can have any desired shape and size and can optionally be suitable for food service. FIG. 1 illustrates a container 10 in the form of a two-piece cup or cup 10 that includes a coated sleeve 12 and a coated bottom 14. The coated sleeve 12 includes a portion defining a sidewall 16 of the cup 10. A rim 18 defines an open end 20 of the coated sleeve 12 at an upper end of the coated sleeve 12. The rim 18 may optionally be rolled, bent, curled, or crimped in a conventional manner. A sidewall seam 22 is formed where overlapping side edges 24, 26 (FIG. 4) of the coated sleeve 12 join together to form the sidewall seam 22, also referred to as a sidewall seal. The sidewall seam 22 is formed by heat and pressure. In polyethylene (PE) extrusion coatings, the PE softens and forms an effective bond and seal. When other coatings are used, the rim 18 may not roll well at the sidewall seam 22 resulting in a piece that sticks out, or a flagger.

Figure 2:
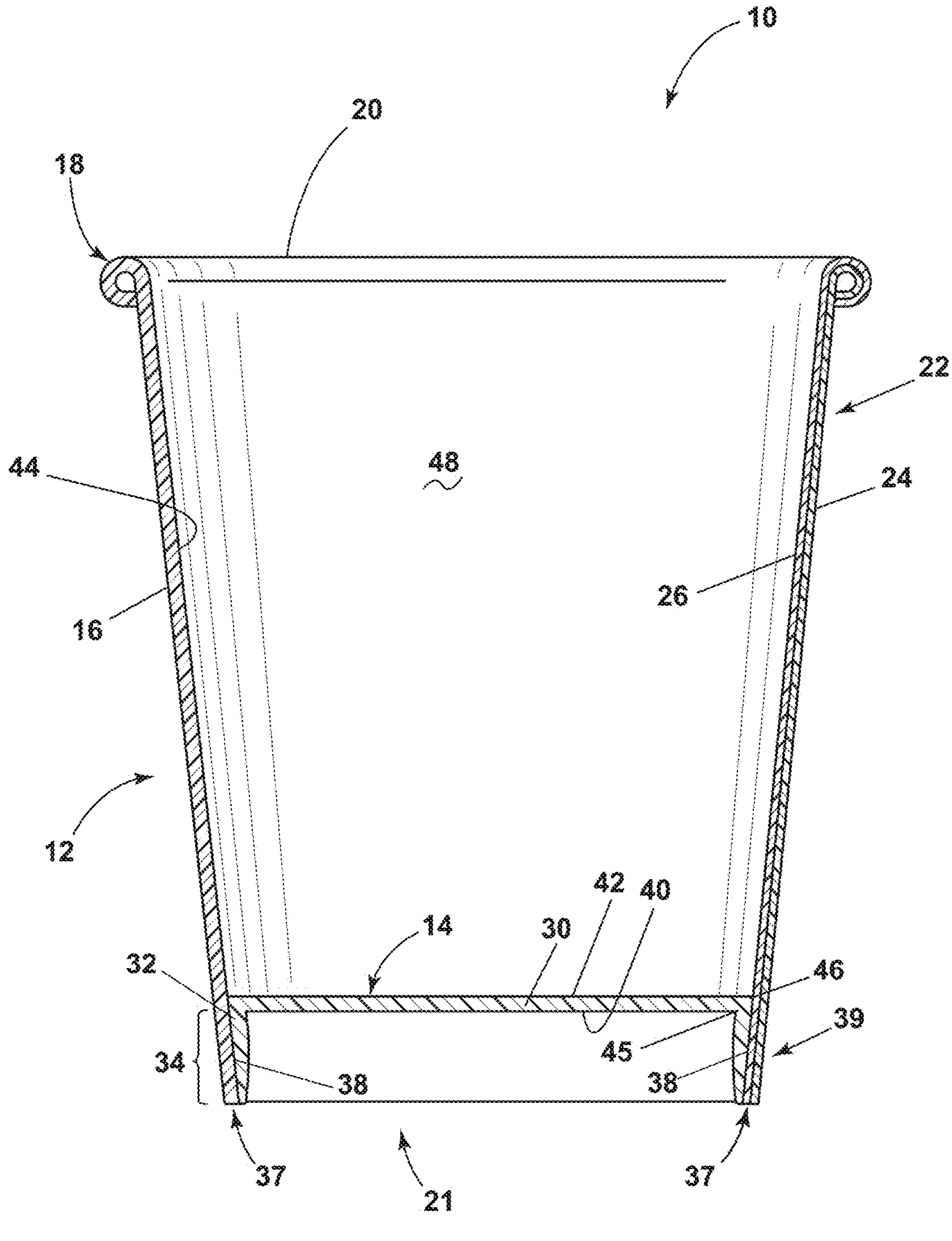
FIG. 2 is a schematic cross-sectional view of a container according to an aspect of the disclosure.

Referring now to FIG. 2, it can better be seen that coated bottom 14 includes a bottom wall 30 and a skirt 32. Folding the coated bottom 14 with multiple creases forms the skirt 32 as well as a compressed corner 45 and a stretched corner 46 between the bottom wall 30 and the skirt 32. A flange 34 is defined at a bottom portion of the coated sleeve 12, opposite the rim 18. The flange 34 defines a bottom opening 21 of the coated sleeve 12 at an lower end of the coated sleeve 12. While the coated sleeve 12 and coated bottom 14 have been illustrated as having a consistent or non-layered cross-section, respectively, in FIGS. 2 and 3, it will be understood that this is for clarity purposes only and that the multiple layers of coatings for each will be discussed in detail with respect to FIGS. 5 and 6.

During assembly, the flange 34 is wrapped around the skirt 32 of the coated bottom 14 such that the skirt 32 is positioned against the flange 34. The flange 34 and the skirt 32 are sealed with each other, closing the bottom opening 21. The application of heat and/or pressure during the assembly forms a seal between the flange 34 and the skirt 32 to form a bottom seam or bottom seal 38 between the coated sleeve 12 and the coated bottom 14. The wrapped skirt 32 and the flange 34 define a foot 37, opposite the rim 18, which supports the cup 10 on a surface. The overlap of the skirt 32 and the two plies of the sidewall seam 22 results in a base seam 39 that is a 3-ply seam.

Once assembled, the bottom wall 30 includes an outer surface 40 facing the foot 37 and an opposing inner surface 42. The foot 37 supports the cup when placed on a flat surface such as a table. The inner surface 42 of the bottom wall 30 together with an inner surface 44 of the sidewall 16, above the bottom wall 30, together define a container cavity 48. The inner surfaces 42 and 44 define the surfaces of the cup 10 that are exposed within the container cavity 48 and may come into contact with the material contained within the container cavity 48.

Figure 3:
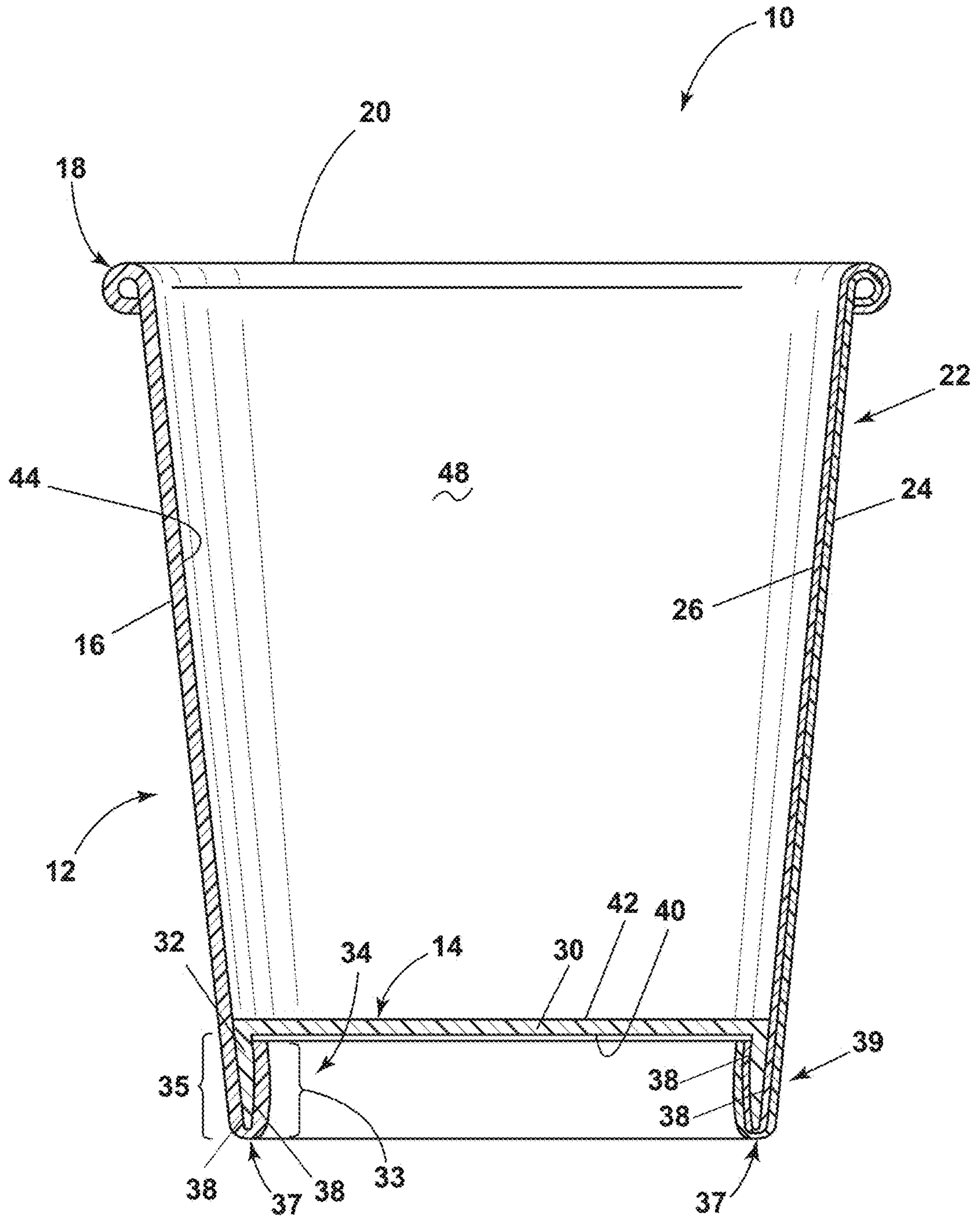
FIG. 3 is a schematic cross-sectional view of a container according to a second aspect of the disclosure.

According to another aspect of the disclosure, FIG. 3 shows the flange 34 can have an inner flange portion 33 and an outer flange portion 35 that can be wrapped around the skirt 32 of the coated bottom 14 such that the skirt 32 is sandwiched between the inner flange portion 33 and the outer flange portion 35. In this case, the outer flange portion 35 and the inner flange portion 33 are 2-ply each in the area of the sidewall seam 22, and thus when combined with the skirt 32, a 5-ply base seam 39 is formed. The strength of the base seam 39 is primary to the stability of the container 10 and is sealed by crimping with raised temperature and high pressure in order to form a robust seal.

Optionally, the cup 10 can be a flat-bottom type cup, rather than the illustrated raised bottom or pot-type cup, in which the coated bottom 14 does not include a skirt and the flange 34 is wrapped and sealed under the bottom wall 30. The flat-bottom type cup can have a bottom wall that is generally flat or has a curved portion.

Figure 4:
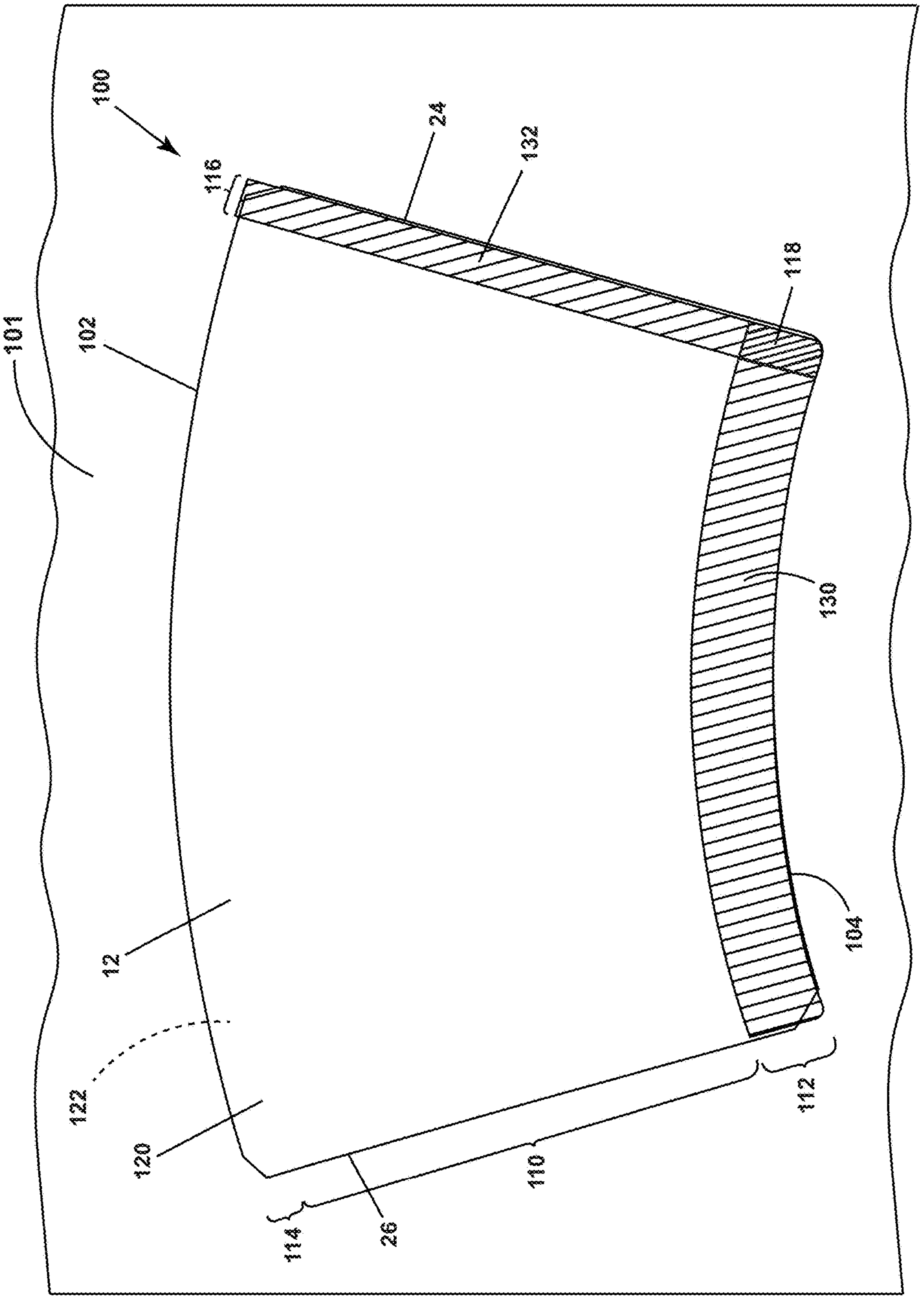
FIG. 4 is a top-down view of a sleeve blank according to an aspect of the present disclosure.

FIG. 4 illustrates that the coated sleeve 12 can be formed from a coated sleeve blank 100 that can be cut from a sheet or web of paper stock 101. The coated sleeve blank 100 includes the first side edge 24 and the second side edge 26, a top edge 102 extending between the first side edge 24 and the second side edge 26 at an upper portion of the coated sleeve blank 100, and a bottom edge 104 extending between the first side edge 24 and the second side edge 26 at a lower portion of the coated sleeve blank 100, opposite the top edge 102.

The coated sleeve blank 100 can be considered to have multiple portions, with each forming a different portion of the assembled cup 10. The coated sleeve blank 100 includes a cavity portion 110 that corresponds to the inner surface 44 of the sidewall 16 that defines the cavity 48 of the cup 10, a bottom portion 112 corresponding to the portion that defines the flange 34 that wraps around the skirt 32, and a top portion 114 corresponding to the rim 18. The coated sleeve blank 100 also includes a seam portion 116 that extends along at least a portion of the first side edge 24 between the top and bottom edges 102 and 104. The bottom portion 112 and the seam portion 116 meet in an overlap region 118. The relative dimensions of the cavity portion 110, the bottom portion 112, the top portion 114, and the seam portion 116 can vary based on the dimensions and structure of the cup 10 that is to be formed. The cavity portion 110 can be defined by the bottom portion 112, the top portion 114, and the seam portion 116. The bottom flange portion 130 is configured to be sealed to the skirt 32 in the formed cup 10 to form the bottom seal 38 (FIGS. 2 and 3) between the coated sleeve 12 and the coated bottom 14. The side edges 24, 26 overlap at seam portion 132 and are sealed to form the sidewall seam 22 (FIG. 1).

The coated sleeve blank 100 also includes an interior surface 120 which faces a central axis of the formed cup 10 and an opposing exterior surface 122 which faces outward, away from the central axis of the formed cup 10.

Figure 5:
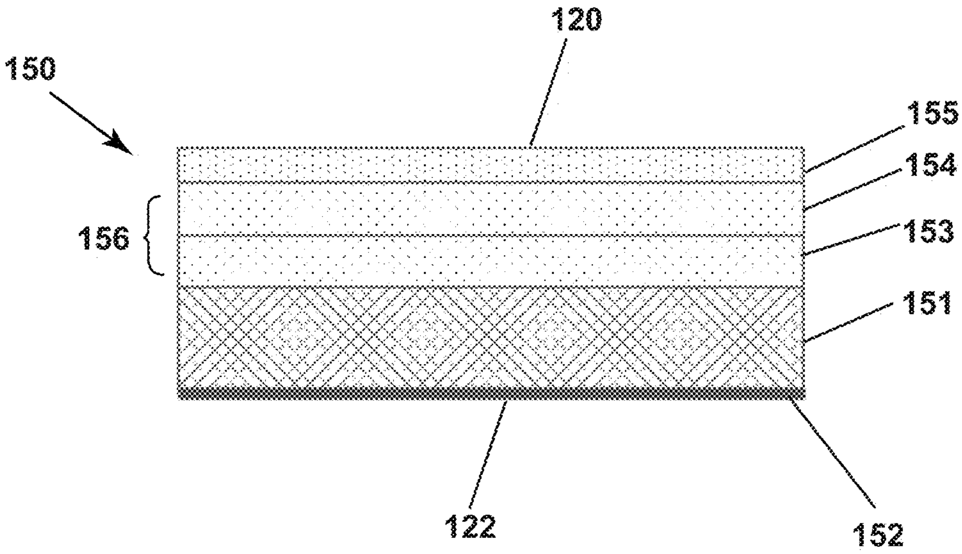
FIG. 5 is a schematic cross-sectional view of a coated sleeve blank substrate.

According to an aspect of the present disclosure, the coated sleeve blank 100 has a multilayer coating 150 as shown in FIG. 5. The examples of the multilayer coating 150 are a styrene-free, acrylic coating, which is recyclable and can function as a barrier coating, and an adhesive, thereby overcoming the disadvantages of the prior art coatings. The multi-layer coating 150 can be applied as a water-based dispersion. The multilayer coating 150 can be applied to any suitable substrate 151, one example of which is made from a solid bleached sulfate (SBS) paperboard paper stock or other paper stock suitable for forming containers. Table 1 lists examples of suitable paper stock for different cup sizes.

TABLE 1

Example paper stock for sleeve blanks

| Hot Cup Size | Caliper-Thickness (inches) | Basis Weight (lbs/3000 $ft^2$) |
|---|---|---|
| 16 oz. and 20 oz. | 0.0180 | 185 |
| 4 oz. | 0.0124 | 126 |
| 6 oz. | 0.0153 | 165 |
| 8 oz. and 12 oz. | 0.0165 | 175 |
| 24 oz. | 0.02 | 210 |

The side of the paper stock that forms the interior surface 120 of the coated sleeve blank 100 can be provided with a styrene-free acrylic multilayer coating 150 according to one aspect of the present disclosure. The paper stock can include the multilayer coating 150 on a single side or can include the same or different multilayer coatings on both sides of the substrate 151.

In one exemplary arrangement, the substrate 151 can have a printed pattern 152 on the exterior surface 122 and the multilayer coating 150 as the interior surface 120 that faces the interior of the container and forms a portion of the cavity 48. The multilayer coating 150 comprises a primer coat 153, a base coat 154, and a top coat 155. The primer coat 153 is directly adjacent the substrate 151 and the base coat 154 is provided on the primer coat 153. A barrier layer 156 can include the primer coat 153, the base coat 154, or a combination of both, and provides aqueous barrier properties. The primer coat 153 and the base coat 154 are each applied at a coat weight of about 6-18 $g/m^2$. Preferably the total coat weight of the barrier layer 156 can be about 14 $g/m^2$. The barrier layer 156 may be applied as two separate coats with different formulary additives, or with the same formulary additives, or combined into one layer fulfilling both the primer coat and base coat functions. The top coat 155 provides block resistance and heat seal properties, and can be applied preferably at a coat weight of 4-8 $g/m^2$. The top coat 155 and base coat 154 can be combined and applied as a single layer with a coat weight of 10-21 $g/m^2$.

In one example, the primer coat 153 and base coat 154 layers comprise homogenous emulsion particles, and can further have processing and stabilization additives to enhance performance. These additives include anti-foaming agents, thickeners, emulsion stabilizers, biocides, and fillers. Table 2 shows an example of a composition of such a primer coat and a base coat.

TABLE 2

Composition of base coat or primer coat.

| Product Name | Function | Wet Coating Mixture (wt %) | Dry Coat Weight (wt %) |
|---|---|---|---|
| Base coat dispersion | coating | 83 | 94 |
| Low-emission de-foamer | anti-foaming agent | 0.3 | 0.4 |
| Rheology modifier | synthetic thickener | 0.3 | 0.4 |
| Polyvinyl alcohol (10%) | emulsion stabilizer | 16.4 | 5.0 |
| Biocide | prevents bio-growth | 100 ppm | 100 ppm |

The primer coat 153 and base coat 154 layers can include any one or any multiple of the additives. The additives can be the same or different in primer coat 153 and base coat 154. For example, the primer coat 153 could include the polyvinyl alcohol (PVOH), alone, or in combination with one or more of the other additives, and the base coat include or not include the polyvinyl alcohol, while include one or more of the other additives. One contemplated primer coat 153 would comprise the polyvinyl alcohol, biocide in water, for example.

Acrylate polymers, for example polymers of methyl methacrylate (MMA), butyl acrylate (BA), and methyl acrylic acid (MAA), are the basis for base coat dispersion for the primer coat 153 and the base coat 154. Table 3 gives an example of components of the primer and base coat layers according to an aspect of the disclosure. In this homogenous emulsion polymer, the emulsion particles have about the same ratio of monomers throughout the entire particle.

TABLE 3

Example of composition of the homogenous emulsion particles

| Chemical | Function | Monomer (%) | Range (%) |
|---|---|---|---|
| methyl methacrylate | Monomer | 45.4 | 1-99 |
| butyl acrylate | Monomer | 53.4 | 1-99 |
| methyl acrylic acid | Monomer | 1.2 | 1-5 |
| ammonium persulfate | Initiator | N/A | N/A |
| sodium bisulfite | Initiator | N/A | N/A |
| polysorbate 20 | Surfactant | N/A | N/A |
| sodium lauryl sulfate | Surfactant | N/A | N/A |
| 28% ammonium hydroxide | pH Adjustment | N/A | N/A |
| sodium carbonate | pH Stabilizer | N/A | N/A |

With respect to the polymer chemistry and formulations, all were developed by the inventors and these styrene-free acrylics adhere to FDA CFR Title 21 Part 177.1010 Regulations. In this example the monomers included: methyl methacrylate, butyl acrylate, methyl acrylic acid, and acrylic acid, the choice of which provides a styrene-free acrylic coating and which results in an odor free product. It will be understood that the polymers of this disclosure are not limited to these monomers, but can include other ionic, polar, non-polar, alkyl, unsaturated, and aromatic acrylate monomers. These monomers are listed in CFR 21 177.1010. An example list of monomers under consideration is given in Table 4.

TABLE 4

Additional monomers under development

| Chemical | Function | Range (%) |
|---|---|---|
| n-butyl methacrylate | monomer | 1-99 |
| ethyl acrylate | monomer | 1-99 |
| 2-ethylhexyl acrylate | monomer | 1-99 |
| ethyl methacrylate | monomer | 1-99 |
| methyl acrylate | monomer | 1-99 |
| acrylamide | monomer | 1-5 |
| acrylic acid | monomer | 1-5 |
| 1,3-butylene glycol dimethacrylate | monomer | 1-5 |
| 1,4-butylene glycol dimethacrylate | monomer | 1-5 |
| diethylene glycol dimethacrylate | monomer | 1-5 |
| diproplylene glycol dimethacrylate | monomer | 1-5 |
| divinylbenzene | monomer | 1-5 |
| ethylene glycol dimethacrylate | monomer | 1-5 |
| itaconic acid | monomer | 1-5 |
| N- methylolacrylamide | monomer | 1-5 |
| N- methylolmethacrylamide | monomer | 1-5 |
| 4-methyl-1,4-pentanediol dimethacrylate | monomer | 1-5 |
| propylene glycol dimethacrylate | monomer | 1-5 |
| trivinylbenzene | monomer | 1-5 |

The primer coat 153 and base coat 154 are conventional emulsion particles with the same ratio of monomers throughout the entire particle and have a consistent glass transition temperature throughout the particle. In one example, the $T_g$ of the homogenous emulsion particle is 0° C. It will be understood that the glass transition temperature can vary from this value including, but not limited to, that the $T_g$ can range from −20° C. to 10° C. The conventional resin particle is soft and provides good coalescence of the particles when the coating or film is forming and provides the barrier properties of the barrier layer 156.

Still referring to FIG. 5, the top coat 155 is the outermost layer of the multilayer coating 150 and is applied on top of the barrier layer 156 and faces the container cavity 48. The top coat 155 includes a heterogeneous emulsion polymer particle dispersion, as well as processing and stabilization additives such as anti-foaming agents, thickeners, emulsion stabilizers, biocides, and microfibrillated cellulose additives. The incorporation of fibrillated cellulose reduces cracking of the coating when the coated substrate is shaped, folded, or pleated. Table 5 gives an example of the components of the top coat.

TABLE 5

Composition of the top coat.

| Product Name | Function | Wet Coating Mixture (wt %) | Dry Coat Weight (wt %) |
|---|---|---|---|
| Top coat dispersion | coating | 80 | 93.6 |
| Low-emission de-foamer | anti-foam | 0.3 | 0.4 |
| Rheology modifier | thickener | 0.4 | 0.3 |
| Polyvinyl alcohol | emulsion stabilizer | 16 | 5.0 |
| Biocide | prevents bio-growth | 100 ppm | 100 ppm |
| Microfibrillated cellulose | reduces cracking | 3.3 | 0.7 |

The heterogeneous emulsion polymer particles have a first portion, such as a core and a second portion such as a shell. Overall the core can comprise a percentage of the heterogeneous emulsion polymer particles ranging from about 50% to 75%. The core polymer includes MMA, MAA, and BA. The inclusion of BA in the MMA/MAA polymer of the core results in a softer polymer as compared to a similar MMA/MAA polymer that is lacking BA or that has a smaller proportion of BA. Further, the inclusion of BA in the polymer lowers the $T_g$ of the core. The MMA:BA:MAA ratio of the core polymer can range from 10:100:5 to 100:10:1. In one example, the core of the heterogeneous emulsion polymer particles has a $T_g$ of 17° C. In another example, the $T_g$ of the core ranges from 5° C. to 20° C. The pliable, soft nature of the core of the polymer particles of this disclosure allows the particle to change shape when a mechanical force is applied to the top coat during heat sealing. One example of the composition of the core polymer is shown in Table 6.

TABLE 6

| Core Composition | | |
|---|---|---|
| Component | Amount (grams) | % |
| MMA | 1200 | 63.8 |
| BA | 660 | 35.1 |
| MAA | 20 | 1.1 |

The shell portion of the heterogeneous emulsion polymer particles can include MMA, BA, and MAA. The shell polymer can be essentially polymethyl methacrylate, although other polymer compositions are contemplated (Table 4). The MMA:BA:MAA ratio of the shell polymer can range from 10:100:5 to 100:10:1 and the $T_g$ of the shell can range from 60° C. to 107° C. In one example, the $T_g$ of the shell is 69° C. and the monomer ratio is 10:100:3. Therefore, the shell is harder than the core and contributes to the top coat anti-block property by providing a non-sticky surface. One example of the composition of the shell polymer is shown in Table 7.

TABLE 7

| Shell Composition | | |
|---|---|---|
| Component | Amount (grams) | % |
| MMA | 1200 | 83.1 |
| BA | 220 | 15.2 |
| MAA | 25 | 1.7 |

In this manner, it will be understood that the chemistry of the top coat 155 utilizes core-shell particles having a soft core and a hard shell. The soft core allows the particle to change shape when undergoing applied mechanical force such as in heat sealing. The hard shell provides an effective anti-block layer to reduce the tackiness of the coating.

It will be understood the barrier layer 156, can be on both sides of the substrate 151. For example, a barrier layer 156 applied only on the interior surface 120 of the cup stock can reduce cost of production. Applying the barrier layer 156 on both sides of the sidewall 16 can prevent ambient condensation, which could soften the outer surface 40 and reduce the cup structure strength.

Figure 6:
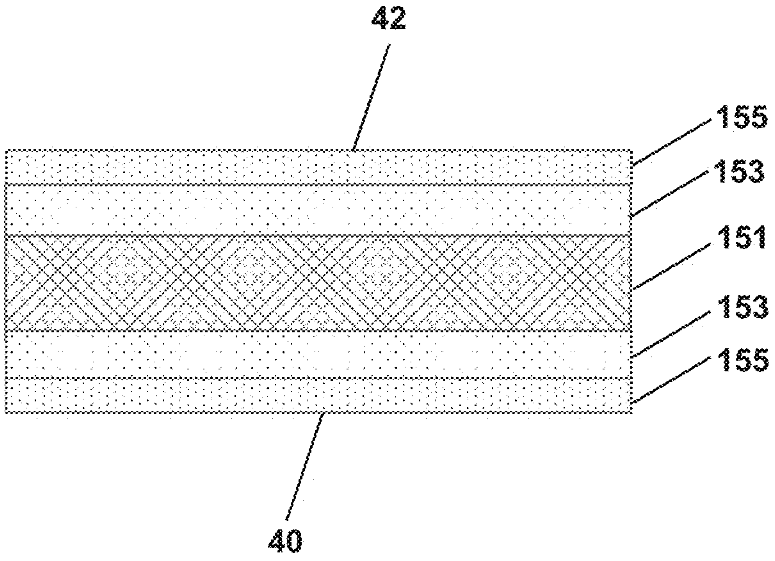
FIG. 6 is a schematic cross-sectional view of a coated bottom blank substrate.

Turning now to FIG. 6, the primer coat 153 and the top coat 155 are applied to both sides of the substrate 151 for the coated bottom 14 in an aspect of the disclosure. The sides of the substrate 151 can be referred to as the top and bottom sides, or the inner surface 42 and the outer surface 40. The primer coat 153 is directly adjacent the substrate 151 and the top coat 155 is provided on the primer coat 153 to form the inner surface 42. On the second side of the substrate, the primer coat 153 is directly adjacent the substrate 151 and the top coat 155 is provided on the primer coat 153 to form the outer surface 40.

The compositions of the primer coat 153 and top coat 155 applied to the coated bottom 14 are the same or similar compositions of the primer coat 153 and top coat 155 applied to the coated sleeve 12. The same reference numerals have been utilized; however, it will be understood that they may vary in composition. The inner surface 42 forms part of the container cavity 48 and is a contact surface for the container contents. A primer coat 153 on the inner surface 42 of the coated bottom 14 and/or the outer surface 40 of the coated bottom 14 prevents the cup contents from contacting and weakening the paper substrate and furthermore is needed for an effective bottom seal 38 and base seam 39. The top coat 155 on the coated bottom 14 provides block resistance. The coated bottom 14 has the primer coat 153 applied at a coat weight of about 6-18 g/$m^2$. The top coat 155 is applied preferably at a coat weight of 4-8 g/$m^2$. Together the coat weights can range from 10-24 g/$m^2$. It will be understood that the coat weights and thicknesses of the coatings on the inner surface 42 can be different from the coat weights and thicknesses of the coatings on the outer surface 40, which can further differ from the coat weights and thicknesses of the coatings on the interior surface 120.

A primer coat 153 on the outer surface 40 of the coated bottom 14 prevents the cup contents from weakening the substrate 151. For example, in the case of a hot liquid beverage in a cup, water vapor can diffuse through the bottom wall 30 of the cup and then condense under a raised cup surface. The trapped humidity under the raised cup surface may soften the bottom wall 30 if it is not protected by a layer of a barrier coating on the outside of the coated bottom 14. A primer coat 153 on each side of the bottom surface helps prevent high moisture vapor content from softening the paper.

According to an aspect of the disclosure, the coating layers can be arranged on the coated bottom 14 in the following sequence: top coat 155, base coat 154, primer coat 153, substrate 151, primer coat 153, base coat 154, and top coat 155. As can be seen in FIGS. 2 and 3, this multilayer arrangement of the coating layers on the coated bottom 14 allows for sufficient sealing contact between the flange 34 and the skirt 32 when assembled resulting in an excellent bottom seal 38. The multilayer coating arrangement further provides barrier layers to protect the substrate 151 from water in the container cavity 48 as well as water vapor beneath the cup.

Other arrangements of the primer coat 153, base coat 154, barrier layer 156, and top coat 155 on the coated bottom 14 are contemplated. For example, a top coat 155 and at least a single layer of primer coat 153 or base coat 154 can be applied to the inner surface 42 of the coated bottom 14 while multiple layers of primer coat 153 or base coat 154 are applied to the outer surface 40. In another example, the inner surface 42 of the coated bottom 14 is bare, with only a top coat 155 and the outer surface 40 of the coated bottom 14 is provided with the barrier layer 156 and top coat 155. An effective heat seal can be formed between two surfaces having primer coat 153, base coat 154, or a barrier layer 156.

Figure 7:
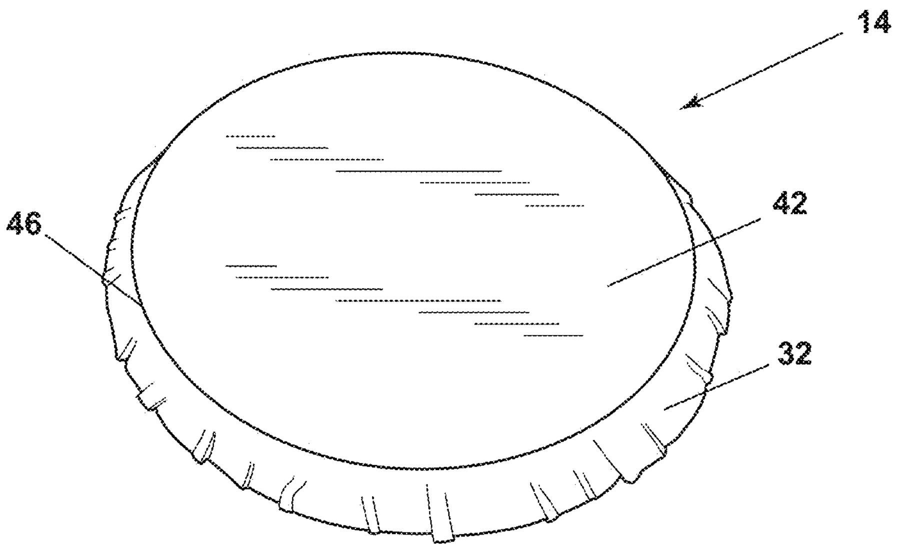
FIG. 7 is a top perspective view of a coated bottom of a container.

FIG. 7 shows the coated bottom 14 and the pleated skirt 32 that contacts and heat seals with the coated sleeve blank 100. The multilayer coating 150 is included on the outer surface 40 and the inner surface 42 of the coated bottom 14 to facilitate the heat seal with the sleeve blank 100. Arrangements of top coat 155 and barrier layer 156 on inner surface 42 of the coated bottom 14 according to an aspect of the disclosure are described above with regard to FIG. 6. When the skirt 32 is formed, the coating in stretched corner 46 undergoes deformation at the convex bend. The convex bend radius of the stretched corner 46 is a common fracture point for dispersion coatings. If the inner surface 42 only has the barrier layer 156 on the coated bottom 14, the coating fractures at the stretched corner 46 will allow liquid content of the container 10 to leak out.

Figure 8:
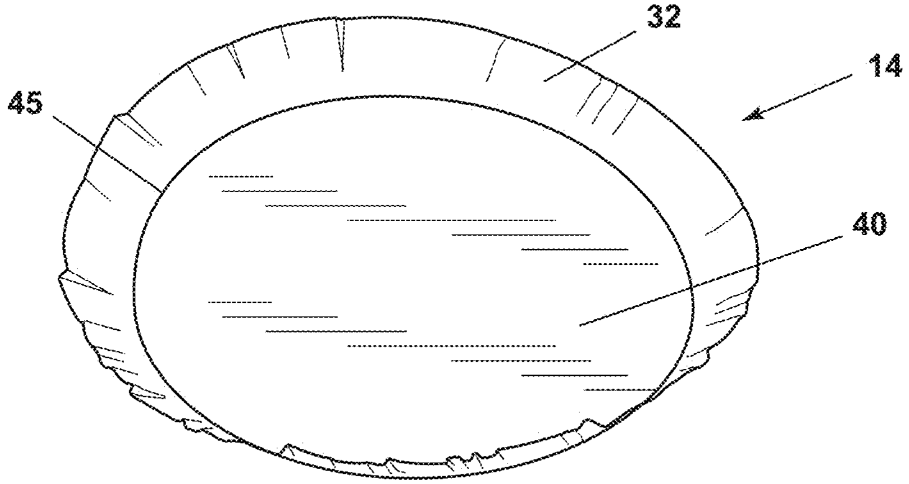
FIG. 8 is a bottom perspective view of the coated bottom of FIG. 7.

FIG. 8 shows the outer surface 40 of coated bottom 14 and the compressed corner 45. When the skirt 32 is formed by the cup machine, the concave bend results in a compression stress on the coating. The crushing forces on the multilayer coating 150 from the compression stress does not lead to fractures, fissures, and cracks as can occur in other types of coatings. Thus, the multilayer coating 150 prevents leakage of the cup contents. The incorporation of fibrillated cellulose in the top coat 155 reduces fissures and aids in film formation and also improves heat sealing of the coating. Furthermore, including the fibrillated cellulose in the top coat 155 does not increase blocking problems. A heater is not needed to soften the coating(s) for formation of the skirt 32 on the coated bottom 14. This provides a benefit in that production rates can be increased.

The primer coat 153 on outer surface 40 seals the 3-ply or 5-ply base seam 39. When the primer coat 153 is included on the outer surface 40, minimal fracturing occurs and no leakage is observed. Furthermore, when the primer coat 153 is included, the outer surface 40 has sufficient strength to maintain the mechanical integrity of the cup even when filled with hot coffee for extended time.

The total thickness of the coatings on the inner surface 42 is sufficient to provide a liquid barrier. The range of the total thickness of the multilayer coating 150 is between 8 to 20 microns. The total thickness of the coatings on the outer surface 40 is sufficient to provide a liquid barrier as well as an anti-fracture coating. A top coat 155 layer is provided on both the inner surface 42 and the outer surface 40 to provide anti-block properties. In an aspect of the disclosure, the total thickness of the coatings on the inner surface 42 are about the same as the total thickness of the coatings on the outer surface 40. In another aspect of the disclosure, the total thickness of the coatings on the inner surface 42 are less than as the total thickness of the coatings on the outer surface 40.

Figure 9:
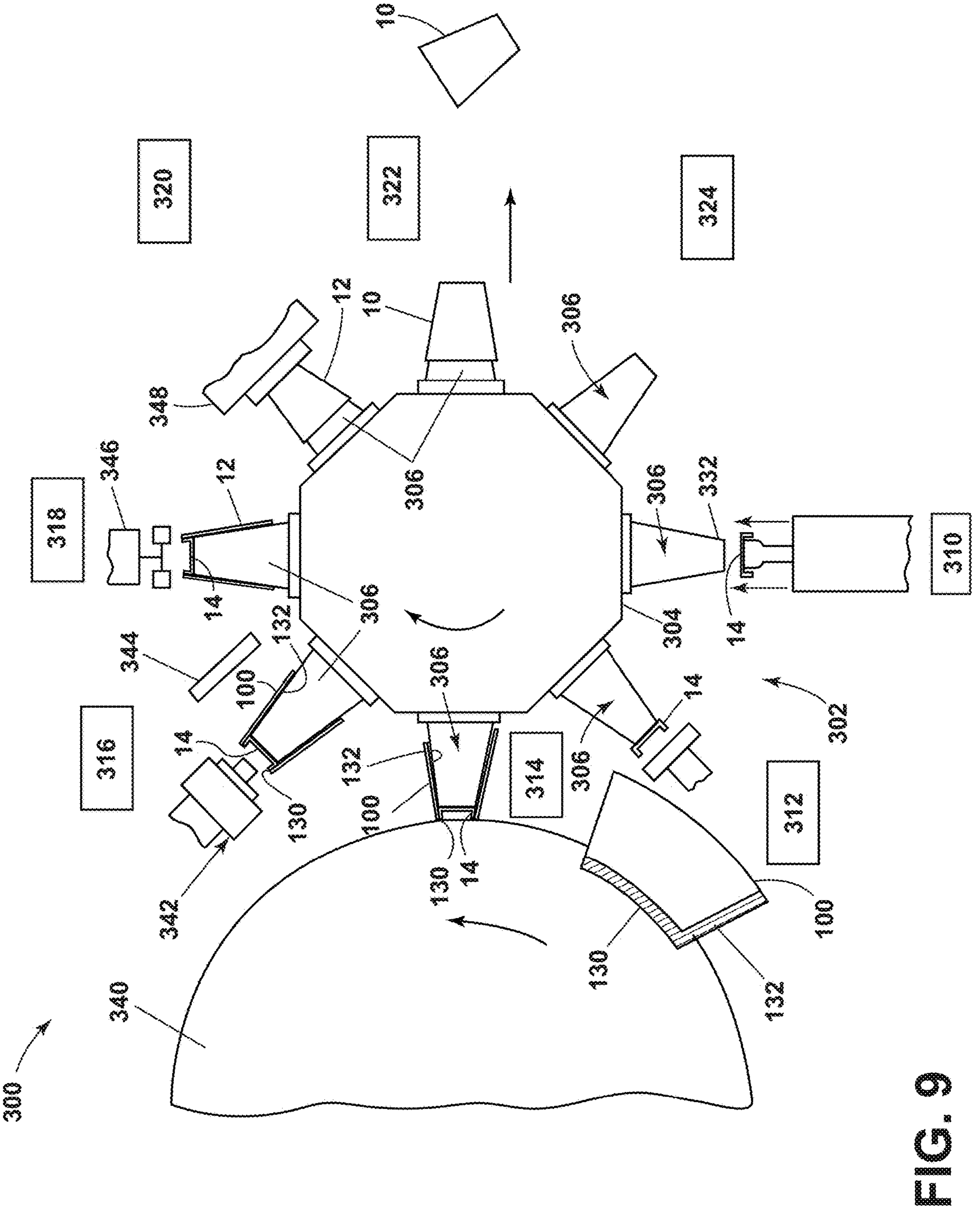
FIG. 9 is a schematic diagram of a process of forming the container of FIG. 2 on a container forming machine according to an aspect of the present disclosure.

FIG. 9 illustrates a container assembly process 300 according to an aspect of the disclosure for forming the container 10 using the coated sleeve blank 100 and the coated bottom 14. The process 300 is provided for illustrative purposes and may proceed in a different logical order or additional or intervening steps may be included, unless otherwise noted. While the process 300 is described in the context of forming the cup 10, the process 300 may be used in a similar manner to form other types of two-piece paper containers.

The process 300 can be implemented using a two-piece container forming machine 302 that includes a forming turret 304 having a plurality of forming mandrels 306 that can be indexed by the forming turret 304 to each of the forming stations 310-324.

The container assembly process 300 begins at 310 with providing the coated bottom 14 to an end section 332 of the mandrel 306. The coated bottom 14 can be held in place on the end section 332 by a vacuum. A bottom blank 105 (not shown) can be cut and from a paper web 101 and formed as coated bottom 14 prior to providing the coated bottom 14 to the container forming machine 302. Optionally, the container forming machine 302 includes a bottom forming station 312 in which the pre-cut bottom blank 105 is bent to form or re-form the coated bottom 14 having a bottom wall 30 and the depending skirt 32. Optionally, the container forming machine 302 includes a bottom blank cutting station (not shown), in which the bottom blank 105 is cut from a paper web prior to station 310 or 312.

At station 314 a transfer turret 340 provides a coated sleeve blank 100 to a wrapping apparatus (not shown) that wraps the coated sleeve blank 100 around the mandrel 306 and the coated bottom 14. The coated sleeve blank 100 is provided to the mandrel 306 with the bottom flange portion 130 and the seam portion 132 facing toward the mandrel 306. The wrapping apparatus wraps the coated sleeve blank 100 around the mandrel 306, including the coated bottom 14 carried by the mandrel 306, such that the seam portion 132 overlaps the opposing side edge 26.

At station 316 the bottom flange portion 130 and the seam portion 132 can be heated in one or more stages simultaneously or sequentially. In the process 300 illustrated, a bottom heater 342 is moved into position in the open bottom end of the wrapped coated sleeve blank 100 to heat the bottom flange portion 130 to form the seal. A seam clamp 344 can be moved into position relative to the overlapped seam portion 132 to apply heat and/or pressure to heat-seal the overlapped side edges of the coated sleeve blank 100 with the seam portion 132. The seam clamp 344 can provide heat and/or pressure to the seam portion 132. Optionally, the seam clamp 344 applies only pressure and a separate heating device is provided for heating the seam portion 132. Heating of the bottom flange portion 130 and the seam portion 132 can be obtained using any suitable heating device or combination of heating devices including radiant heat and heated air diffusers. Optionally, the bottom flange and seam portions 130, 132 can be heated while the coated sleeve blank 100 is on the transfer turret 340, prior to wrapping the coated sleeve blank 100 onto the mandrel 306 at station 314.

The mandrel 306 is next optionally indexed to station 318 wherein a bottom forming tool 346 is moved into position to shape the coated bottom 14. In an aspect of the disclosure, the bottom forming tool 346 folds the flange 34 including the bottom flange portion 130 around the skirt 32 of the coated bottom 14. When the flange 34 is sealed with the skirt 32, the overlap region 118 of the bottom flange portion 130 forms a 3-ply (FIG. 2) or 5-ply layer (FIG. 3) at the base seam 39. Heat from the bottom heater 342 applied at station 316 facilitates adhesion of the flange 34 to the skirt 32. At station 320, bottom clamp 348 is utilized to apply pressure and tightly crimp the flange 34 and skirt 32 to facilitate heat-sealing the coated bottom flange portion 130 to the skirt 32 to form the bottom seal 38 between the coated sleeve 12 and the coated bottom 14.

The mandrel 306 is then indexed to station 322 where the formed cup 10 is ejected. The free mandrel 306 is indexed to station 324 where it is in position to receive the next coated bottom 14 at station 310.

According to one aspect, the formed cup 10 may be ejected to a rimming station (not shown) that curls or folds the top edge 102 to form the rim 18. The portion of the sidewall seam 22 near the top edge 102 that forms the rim 18 can be stretched during the rimming process, which can decrease the strength of the seal of the sidewall seam 22 in the rim 18. Further, when other coatings are used, the seam location on the rim 18 does not conform to the rim shape and sometimes turns outward as a flagger. Heat-sealing the seam portion 116 according to the present disclosure addresses these challenges in maintaining the desired shape and uniformity of the rim 18 and strength of the sidewall seam seal in the areas of the rim 18 and the 3-ply or 5-ply base seam 39 while allowing the cup forming process to proceed at acceptable rates.

The forming turret 304 rapidly indexes the coated sleeve blank 100 and the coated bottom 14 through the various stations 310-324 to rapidly form the cup 10. A delay or pause at any of the stations 310-324 can result in a decrease in the rate of formation of the cup 10. Decreases in the rate of formation decrease the number of cups 10 formed, which can increase production times and costs.

The cup 10 described herein can be designed for acidic or nonacidic aqueous products, optionally containing salt, sugar, or oil-in-water emulsions of low- or high-fat content, or mixtures thereof and is highly repulpable. Cups 10 can be produced from this multilayer coated paper stock on existing equipment at rates of 300 cups per minute (cpm) or more.

Figure 10:
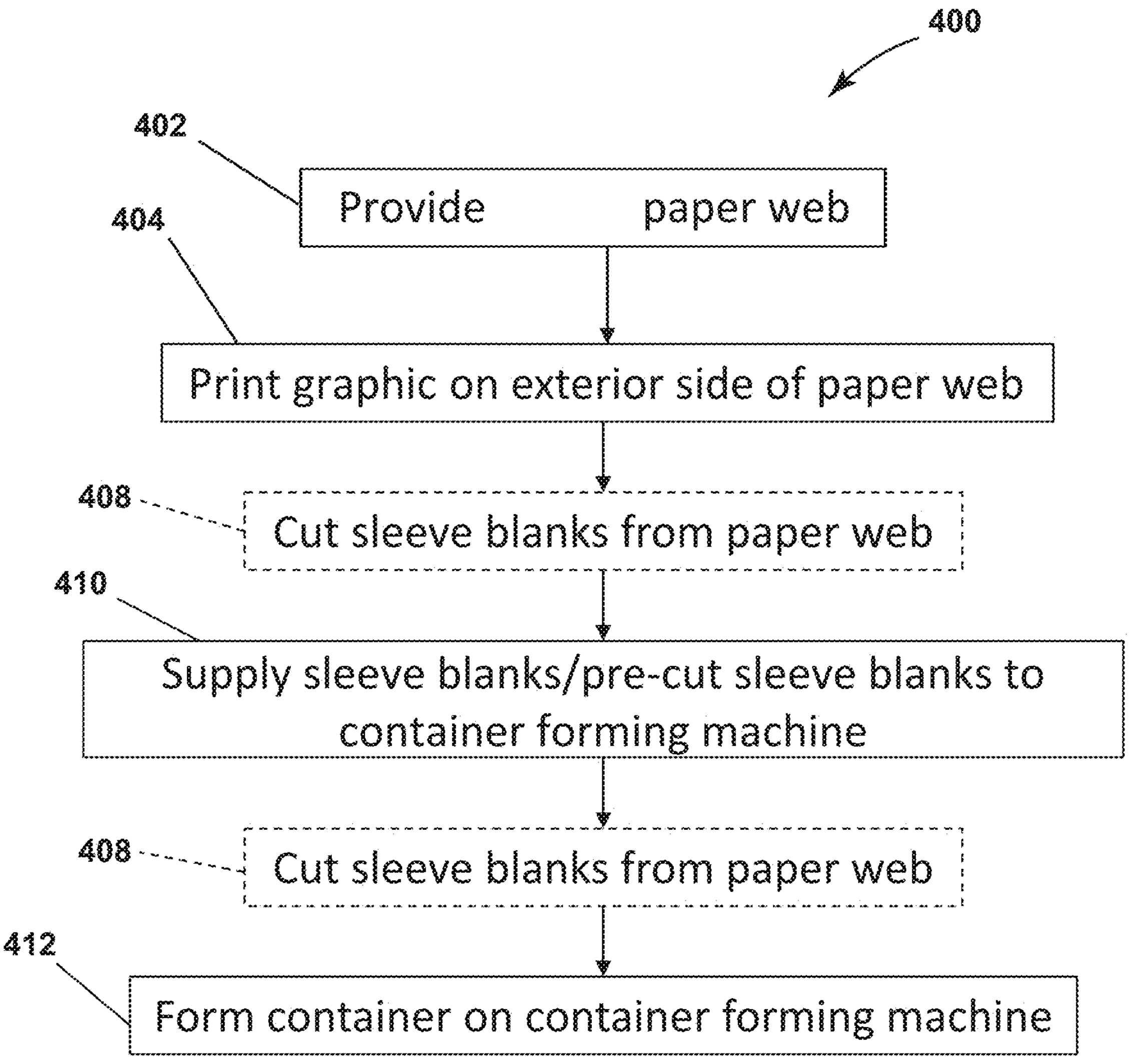
FIG. 10 is a flowchart diagram illustrating a process of forming a container according to an aspect of the present disclosure.

FIG. 10 illustrates a process 400 for forming a two-piece paper container according to an aspect of the disclosure using a paper sleeve blank 100 and coated bottom 14. The process 400 is provided for illustrative purposes and may proceed in a different logical order or additional or intervening steps may be included, unless otherwise noted. While the process 400 is described in the context of forming the cup 10 from coated sleeve blank 100, the process 400 may be used in a similar manner to form other types of two-piece paper containers using other suitable sleeve blanks.

The process 400 begins at 402 with providing a coated paper web 101 to a printing assembly. The coated paper web 101 can be supplied to the printing assembly with at least the barrier layer 156, and preferably the barrier layer 156 and top coat 155, already applied to the surface of the coated paper web 101 that will become the interior surface 120 of the container 10. For greatest effectiveness, the barrier layer 156 would comprise both the primer coat 153 and the base coat 154, with one option being the primer coat 153 using only the polyvinyl alcohol as an additive, with the possible addition of a biocide. This paper web 101 can be used to form the sleeve blank 100.

While the bottom blank 105 and coated bottom 14 are not contemplated to have the same coating as the sleeve blank 100, and the coated bottom 14 and bottom blank 105 typically do not have a printed image, it is anticipated that the coated bottom 14 and bottom blank 105 would be formed from a different paper web than the sleeve blank 100. However, if it is desired to have the same coating on the coated bottom 14 as the sleeve blank 100 and/or print on the coated bottom 14, then the bottom blank 105 and coated bottom 14 can be formed from the same paper web 101 as the sleeve blank 100.

The printing assembly can include one or more ink printing stations for printing graphic on the coated paper web 101. At 404 graphics are printed on an exterior side 103 (not shown) of the coated paper web 101 by passing the coated paper web 101 through one or more ink printing stations as are known in the art. The exterior side 103 of the coated paper web 101 is defined herein as the side of the paper web 101 that will form the exterior surface 122 of the container 10 formed using the sleeve blanks 100 cut from the coated paper web 101.

The printing assembly can be used to print additional coating over the entire paper web 101 or portions, such as discrete spots, of the paper web 101 from which sleeve blank 100, or bottom blank 105, is to be made. For example, the printing assembly could print one or more additional layers of any one of or combination of primer coat 153, base coat 154, and/or top coat 155 to all or a portion of the paper web 101. A more specific example is that the base coat 154 and top coat 155 could be printed on the paper web 101 at a location corresponding to one or both of the bottom portion 112 or the seam portion 116 of the sleeve blank 100, which would form multiple layers of the base coat 154 and top coat 155 at these portions of the sleeve blank 100. These multiple layers of the base coat 154 and top coat 155 would improve the adhesive function of the water-based dispersion, styrene-free acrylic coating, further negating the need for any additional adhesive.

The graphic printing at 404 produces a printed coated paper web that is optionally supplied to a blank cutter at 408 for cutting the sleeve blanks 100 from the printed coated paper web. The pre-cut sleeve blanks 100 can then by supplied to a two-piece container forming machine at 410, such as the two-piece container forming machine 302 of FIG. 9. Optionally, the printed coated paper web can be supplied to the two-piece container forming machine at 410 and the container forming machine can include a blank cutting station to cut the sleeve blanks from printed paper web.

At 412, the two-piece container forming machine can form the container 10 using the sleeve blank 100 according to the present disclosure and a bottom blank. The sleeve blank 100 can be wrapped around a coated bottom 14. Heat provided by heaters on the container forming machine cause the top coat 155 of the multilayer coating 150 to soften or melt and form a heat seal. Thus, the multilayer coating 150 forms a sidewall seam 22 and a bottom seal 38 and base seam 39 to form the two-piece paper container 10. Most dispersion-based coatings are based on styrene-acrylic chemistry. Styrene-based polymers are undesirable due to user perception of styrene as a non-sustainable material. Furthermore, many dispersion coatings have a surface tackiness that leads to blocking. Using additives or varying the composition to lower the glass transition temperature of a coating often leads to blocking and the anti-block additives can significantly undermine the heat sealing. Furthermore, most dispersion coatings are brittle. When bottom stock is shaped and folded with pleats for the seal of the bottom stock to the sidewall, the brittleness of the dispersion coating causes fracturing. To reduce this kind of fracture, additional heating stations can be used to soften the coating; however, this approach limits the rate of production and can increase cost of production. The disclosed water-based dispersion, styrene-free, acrylic multilayer coating can be used in conjunction with a container forming machine that does not require additional heating stations. The disclosed water-based dispersion, styrene-free, acrylic multilayer coating also functions as an adhesive, which eliminates the need for applying additional adhesive in the container forming station.

Figure 11:
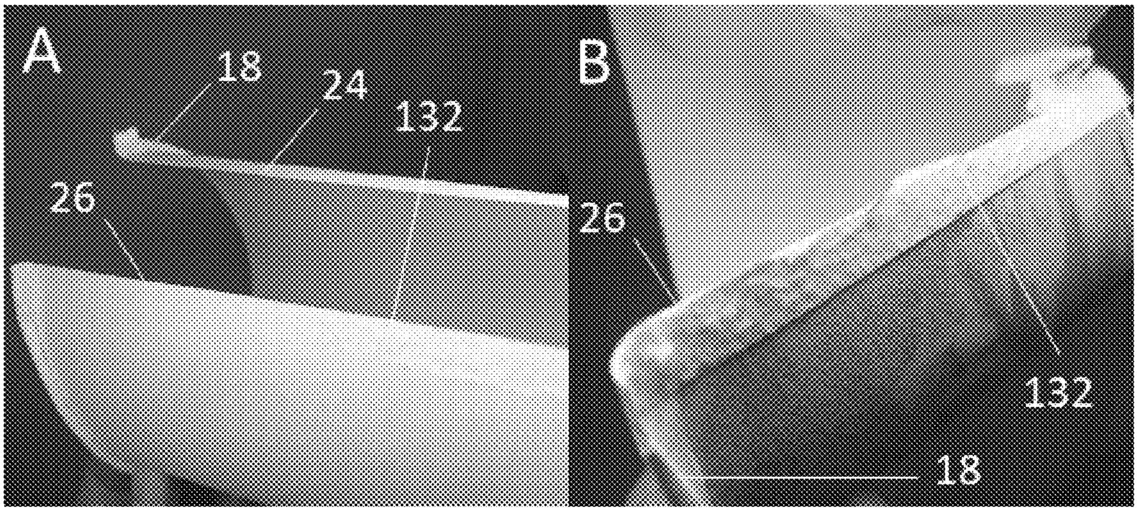
FIG. 11 is an exemplary comparison of deconstructed containers where (A) shows a container with a first coating containing and (B) shows the container of FIG. 2 with a second coating according to aspects of the present disclosure.
Figure 12:
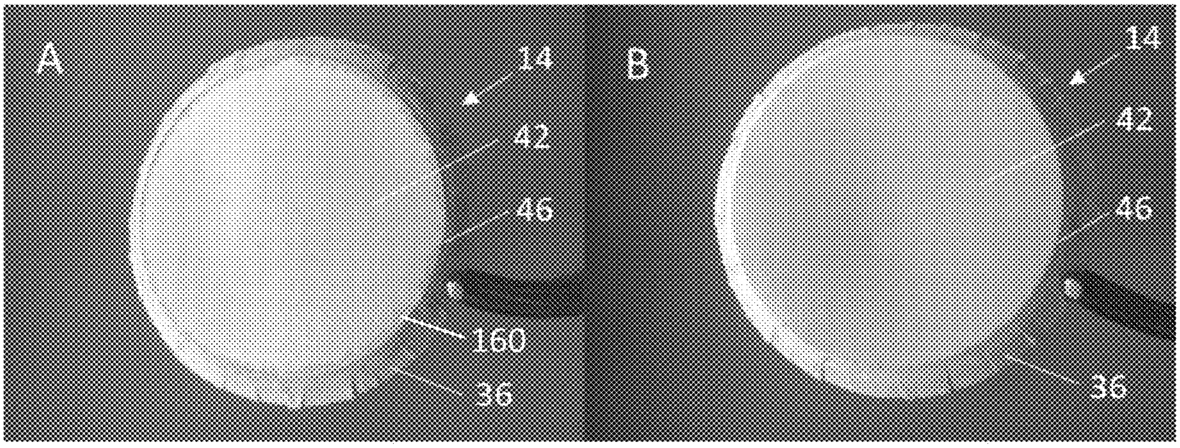
FIG. 12 is an exemplary comparison of deconstructed bottom pieces where (A) shows a coated cup bottom and (B) a coated bottom prepared according to aspects of the present disclosure with no perimeter leakage.

Turning now to FIG. 11, examples A and B of deconstructed cups 10 are shown, where the amount of fiber left adhered at seam portion 132 after deconstruction is an indication of adhesive performance. A substantial amount of fiber indicates a superior adhesive seal, while less fiber indicates an inferior seal. FIG. 11A shows a cup 10 formed with a coating containing an anti-block additive which has impaired the heat seal capability. The sidewall seam 22 has come apart with minimal fiber left at seam portion 132. FIG. 11B shows a cup 10 formed with the disclosed multilayer coating 150 and demonstrates a superior heat seal as the fiber tear is continuous at the seam portion 132, Turning now to FIG. 12, example A shows a deconstructed coated bottom 14 exhibiting discoloration 160 at the stretched corner 46 from a colored beverage previously held inside the cup 10. This discoloration 160 is due to perimeter leakage, which can be attributed to coating fractures at the stretched corner 46 that occur due to the mechanical forces of shaping the coated bottom 14. FIG. 12, example B shows a deconstructed coated bottom 14 with a multilayer coating 150 including a primer coat 153 with PVOH, according to aspects of the current disclosure. In this case, no discoloration 160 is observed, indicating perimeter leakage can be significantly reduced or eliminated when a multilayer coating 150 is included in coated bottom 14.

Coated paper stock having the water-based dispersion, styrene-free, acrylic multilayer coating does not block and the paper unwinds from the roll without difficulty. Further, the heat seal is effective as demonstrated by the full fiber tear in the seam when using the disclosed coating as shown in FIG. 11. The disclosed multilayer coating is therefore advantageous over using an anti-block additive as the chemistry itself effectively eliminates the blocking problem while maintaining a good heat seal property for achieving seam seal strength.

Commercial two-piece container forming machines are capable of forming upwards of 300 containers per minute. However, this high rate of container forming can be challenging to realize for containers made from paper that does not include a polyethylene-based coating. Aspects of the present disclosure provide a coated sleeve blank, process and container forming assembly which can be used to form containers using paper that is free of polyethylene-based coatings on a container forming machine at rates comparable to containers made from polyethylene-based coated paper.

Earlier two-piece paper container forming machines had much slower production rates than the 300 containers per minute rate of current machines. As polyethylene-based coated containers came into the market, the rate at which the container forming machines can form a container has also increased. The polyethylene-based coating acts as a barrier coating to protect the paper substrate, but is also heat sealable and thus acts as an adhesive for forming the container, thus removing the need to have an adhesive applying station as part of the container forming machine. Removing the adhesive applying station from the container forming machine increases the rate at which the machine can be operated and thus contributes to increasing the rate at which polyethylene-based coated containers are formed.

Conventional forming of two-piece containers has a variety of flaws and slow production rates. There is a desire in some markets to move away from styrene-based coated containers and utilize containers that include an aqueous-based barrier coating or are wax coated after assembly. Polyethylene-based coated containers can be challenging to recycle, whereas certain wax and aqueous-based barrier coatings may be more amenable to recycling and/or biodegrading. However, it has been challenging to identify aqueous-based barrier coatings that are heat-sealable for forming the sidewall seam and bottom seal in the containers at rates comparable to traditional polyethylene-based coatings.

Aspects of the present disclosure allow for a coated sleeve blank to be sent to the container forming machine where the coated sleeve blank is wrapped around a mandrel to form the coated sleeve which is sealed with the coated bottom blank to form the container. In this manner, application of an adhesive in the container forming station and post-container forming heat softening of the coatings are not steps in the container forming process and therefore do not limit the rate of container forming. Because the multilayer coating has been applied to the sleeve blank prior to the sleeve blank being provided to the container forming machine, the container forming machine does not have to include an additional adhesive applying step or additional heating step, which would limit the rate at which the containers are formed on the machine. Since the disclosed coating is styrene-free, styrene-free containers can be formed on a container forming machine at production rates comparable to that of a polyethylene-based coated container.

Aspects of the disclosure allow for the use of styrene to be avoided. In addition, the use of acrylate polymers on the sleeve blank decreases the presence of offensive odors. By using this composition, no additional heating steps are required for the container forming machine, and the multilayer coating allows the containers to be repulpable.

To the extent not already described, the different features and structures of the various aspects of the present disclosure may be used in combination with each other as desired. For example, one or more of the features illustrated and/or described with respect to one of the container 10, coated sleeve blank 100, or processes 300 and 400 can be used with or combined with one or more features illustrated and/or described with respect to the other of the container 10, coated sleeve blank 100, or processes 300 and 400. That one feature may not be illustrated in all of the aspects is not meant to be construed that it cannot be, but is done for brevity of description. Thus, the various features of the different aspects may be mixed and matched as desired to form new aspects, whether or not the new aspects are expressly described. For example, the paper web containing the sleeve blanks with the multilayer coating can be stored as a pre-coated roll for supplying to the container forming machine. In another aspect, the coated sleeve blanks can be cut from the web and supplied to the container forming machine as pre-cut, pre-coated sleeve blanks.

While aspects of the present disclosure have been specifically described in connection with certain specific aspects thereof, it is to be understood that this is by way of illustration and not of limitation. Reasonable variation and modification are possible within the scope of the forgoing disclosure and drawings without departing from the spirit of the present disclosure which is defined in the appended claims. Further aspects of the present disclosure are provided by the subject matter of the following clauses:

1. A paper container comprising: a paper sleeve having an inner surface and an outer surface and comprising: overlapping side edges defining a sidewall seam, a top portion defining top opening, a bottom portion defining a bottom opening, and a side wall portion extending between the top portion and the bottom portion; a paper bottom, affixed to the bottom portion and closing the bottom opening, and having an inner surface and an outer surface; and a multi-layer, aqueous-based, styrene-free, acrylic coating applied to the inner surface of at least the paper sleeve comprising: a barrier layer confronting the inner surface of at least the paper sleeve, and a top coat confronting the barrier layer.

2. The paper container of any preceding clause, wherein the top coat comprises a heterogenous emulsion polymer particle core-shell particle.

3. The paper container of any preceding clause, wherein the barrier layer comprises an emulsion homogenous polymer particle.

4. The paper container of any preceding clause, wherein the heterogenous emulsion polymer comprises a mixture of monomers including methyl methacrylate, butyl acrylate, and (meth)acrylic acid.

5. The paper container of any preceding clause, wherein the main monomer weight ratio of the core is methyl methacrylate:butyl acrylate in the range from 1:99 to 99:1.

6. The paper container of any preceding clause, wherein the barrier layer and the top coat have different glass transition temperatures $T_g$.

7. The paper container of any preceding clause, wherein barrier layer has a $T_g$ of −50° C. to 40° C., the core in the top coat has a $T_g$ of −50° C. to 80° C., and the shell in the top coat has a $T_g$ of −20° C. to 107° C.

8. The paper container of any preceding clause, wherein barrier layer has a $T_g$ of −20° C. to 10° C., the core of the top coat has a $T_g$ of 0° C. to 40° C., and the shell of the top coat has a $T_g$ of 20° C. to 107° C.

9. The paper container of any preceding clause, wherein the barrier layer has a coat weight of 6-18 g/m$^2$ and the top coat has a coat weight of 4-8 g/m$^2$.

10. The paper container of any preceding clause, wherein the barrier layer comprises a primer coat confronting the inner surface and a base coat confronting the primer coat.

11. The paper container of any preceding clause, wherein the primer coat has at least one of PVOH emulsion particles, acrylic emulsion particles, or a mixture of both.

12. The paper container of any preceding clause, wherein the base coat comprises acrylic emulsion particles.

13. The paper container of any preceding clause, wherein the primer coat further comprises a biocide additive.

14. The paper container of any preceding clause, wherein the primer coat and base coat have different additives.

15. The paper container of any preceding clause, wherein the additives are selected from the group comprising: adhesion promoters, de-gassing additives, flow promoters, defoamers, colorants, stabilizers, biocides, wetting agents, surfactants, fillers, dispersants, plasticizers, or rheological additives.

16. The paper container of any preceding clause, wherein the base coat has additives comprising an anti-foaming agent, synthetic thickener, emulsion stabilizer, and a biocide.

17. The paper container of any preceding clause, wherein the top coat comprises a heterogeneous emulsion polymer particle dispersion having additives selected from the group comprising: adhesion promoters, de-gassing additives, flow promoters, defoamers, colorants, stabilizers, biocides, wetting agents, surfactants, fillers, dispersants, plasticizers, or rheological additives.

18. The paper container of any preceding clause, wherein the heterogeneous emulsion polymer particles of the top coat have a core and a shell.

19. The paper container of any preceding clause, wherein the core and shell have different glass transition temperatures.

20. The paper container of any preceding clause, wherein the homogenous emulsion particles of the barrier layer have a different glass transition temperature than the core and the shell of the top coat.

21. A paper container comprising: a paper sleeve having an inner surface and an outer surface and comprising: overlapping side edges defining a sidewall seam, a top portion defining top opening, a bottom portion defining a bottom opening, and a side wall portion extending between the top portion and the bottom portion; a paper bottom, affixed to the bottom portion and closing the bottom opening, and having an inner surface and an outer surface; a first multi-layer, styrene-free, acrylic coating applied to the inner surface of the paper sleeve to form a first barrier layer; a second multi-layer, styrene-free, acrylic coating applied to the inner surface of the paper bottom to form a second barrier layer; wherein the first and second multi-layer, styrene-free, acrylic coatings have different layers.

22. The paper container of any preceding clause, wherein the first multi-layer, styrene-free, acrylic coating comprises a first primer coat confronting the inner surface of the sleeve, a first base coat confronting the first primer coat, and a first top coat confronting the first base coat.

23. The paper container of any preceding clause, wherein the second multi-layer, styrene-free, acrylic coating comprises a second primer coat confronting the inner surface of the paper bottom and a second top coat confronting the second primer coat.

24. The paper container of any preceding clause, wherein the first and second top coats have the same chemical formulation.

25. The paper container of any preceding clause, wherein the first and second primer coats have the same chemical formulation.

26. The paper container of any preceding clause, wherein the first and second primer coats have different chemical formulations.

27. The paper container of any preceding clause, wherein the first base coat has additives comprising an anti-foaming agent, synthetic thickener, emulsion stabilizer, and a biocide.

28. The paper container of any preceding clause, wherein the first top coat comprises a heterogeneous emulsion polymer particle dispersion having additives comprising an anti-foaming agent, thickener, emulsion stabilizer, biocide, and fibrillated cellulose.

29. The paper container of any preceding clause, wherein the heterogeneous emulsion polymer particles of the first top coat have a core and a shell.

30. The paper container of any preceding clause, wherein the core and shell have different glass transition temperatures.

31. The paper container of any preceding clause, wherein at least one of the first primer coat and the first base coat comprise homogenous emulsion particles having a different glass transition temperature than the core and the shell of the top coat.

32. The paper container of any preceding clause, wherein the second multi-layer, styrene-free, acrylic coating is applied to the outer surface of the paper bottom.

33. The paper container of any preceding clause, wherein the first multi-layer, styrene-free, acrylic coating is applied to the outer surface of the paper sleeve.

34. The paper container of any preceding clause, wherein the first multi-layer, styrene-free, acrylic coating adheres the overlapping edges of the sidewall seam.

35. The paper container of any preceding clause, wherein no additional adhesive adheres the overlapping edges of the sidewall seam.

36. A method of making a paper container comprising: wrapping a paper sleeve blank around a paper bottom blank, to form a bottom seam between the paper sleeve blank and the paper bottom blank, and overlapping side edges of the paper sleeve blank to form a sidewall seam, with an inner surface of the paper bottom blank having a first multi-layer, styrene-free, acrylic coating, and both an inner surface and outer surface of the paper bottom blank having a second multi-layer, styrene-free, acrylic coating on an inner surface of the paper bottom; and applying at least pressure to at least the sidewall seam without the addition of an adhesive separate from the first multi-layer, styrene-free, acrylic coating to bond the overlapping side edges at the sidewall seam.

37. The method of any preceding clause, further comprising applying pressure and heat to at least the sidewall seam.

38. The method of any preceding clause, further comprising applying at least one of pressure and heat to the bottom seam without the addition of an adhesive separate from the first and second multi-layer, styrene-free, acrylic coating to bond the paper sleeve blank to the paper bottom blank at the bottom seam.

39. The method of any preceding clause, wherein the first multi-layer, styrene-free, acrylic coating is different from the second multi-layer, styrene-free, acrylic coating.

40. The method of claim 39 wherein the first multi-layer, styrene-free, acrylic coating comprises a first primer coat confronting the inner surface of the sleeve, a first base coat confronting the first primer coat, and a first top coat confronting the first base coat.

41. The method of any preceding clause, wherein the second multi-layer, styrene-free, acrylic coating comprises a second primer coat confronting the inner surface of the paper bottom and a second top coat confronting the second primer coat.

42. The method of any preceding clause, wherein the first and second top coats have the same chemical formulation.

43. The method of any preceding clause, wherein the first and second primer coats have the same chemical formulation.

44. The method of any preceding clause, wherein the first and second primer coats have different chemical formulations.

45. The method of any preceding clause, wherein at least one of the first and second primer coats comprises homogenous emulsion particles with additives comprising polyvinyl alcohol and biocide.

46. The method of any preceding clause, wherein at least one of the first and second top coats comprises a heterogeneous emulsion polymer particle dispersion comprising additives comprising an anti-foaming agent, thickener, emulsion stabilizer, biocide, and fibrillated cellulose.

47. The method of any preceding clause, wherein the first multi-layer, styrene-free, acrylic coating comprises a third base coat confronting the first top coat and a third top coat confronting the third base coat.

48. The method of any preceding clause, wherein the third base coat and third top coat are only applied at, at least one of, the sidewall seam or the bottom seam.

49. The method of any preceding clause, further comprising cutting the sleeve paper blank from a web.

50. The method of any preceding clause, wherein the web is pre-coated with the first primer coat, first base coat, and the first top coat.

51. The method of any preceding clause, wherein the third base coat and third top coat are printed onto the web prior to the cutting of the paper sleeve blank.

52. The method of any preceding clause, further comprising printing an image on an outer surface of the web corresponding to the paper sleeve blank.

What is claimed is:

1. A paper container comprising:

a paper sleeve having an inner surface and an outer surface and comprising:

overlapping side edges defining a sidewall seam;

a top portion defining a top opening;

a bottom portion defining a bottom opening; and a side wall portion extending between the top portion and the bottom portion;

a paper bottom, affixed to the bottom portion and closing the bottom opening, and having an inner surface and an outer surface; and a multi-layer, aqueous-based, styrene-free, acrylate polymer coating applied to an entirety of the inner surface of at least the paper sleeve, the multi-layer, aqueous-based, styrene-free, acrylate polymer coating comprising:

an aqueous-based, styrene-free, acrylate polymer barrier layer confronting the inner surface of at least the paper sleeve; and an aqueous-based, styrene-free, acrylate polymer top coat confronting the barrier layer.

2. The paper container of claim 1 wherein the aqueous-based, styrene-free, acrylate polymer top coat comprises a heterogenous emulsion polymer particle core-shell particle.

3. The paper container of claim 2 wherein the aqueous-based, styrene-free, acrylate polymer barrier layer comprises an emulsion homogenous polymer particle.

4. The paper container of claim 2 wherein the heterogenous emulsion polymer comprises a mixture of monomers including methyl methacrylate, butyl acrylate, and (meth) acrylic acid.

5. The paper container of claim 4 wherein the main monomer weight ratio of the core is methyl methacrylate: butyl acrylate in the range from 1:99 to 99:1.

6. The paper container of claim 2 wherein the aqueous-based, styrene-free, acrylate polymer barrier layer and the aqueous-based, styrene-free, acrylate polymer top coat have different glass transition temperatures Tg.

7. The paper container of claim 6 wherein the aqueous-based, styrene-free, acrylate polymer barrier layer has a Tg of −50° C. to 40° C., the core in the aqueous-based, styrene-free, acrylate polymer top coat has a Tg of −50° C. to 80° C., and the shell in the aqueous-based, styrene-free, acrylate polymer top coat has a Tg of −20° C. to 107° C.

8. The paper container of claim 6 wherein the aqueous-based, styrene-free, acrylate polymer barrier layer has a Tg of −20° C. to 10° C., the core of the aqueous-based, styrene-free, acrylate polymer top coat has a Tg of 0° C. to 40° C., and the shell of the aqueous-based, styrene-free, acrylate polymer top coat has a Tg of 20° C. to 107° C.

9. The paper container of claim 1 wherein the aqueous-based, styrene-free, acrylate polymer barrier layer has a coat weight of 6-18 $g/m^2$ and the aqueous-based, styrene-free, acrylate polymer top coat has a coat weight of 4-8 $g/m^2$.

10. The paper container of claim 1 wherein the aqueous-based, styrene-free, acrylate polymer barrier layer comprises a primer coat confronting the inner surface and a base coat confronting the primer coat.

11. The paper container of claim 10 wherein the primer coat has at least one of PVOH emulsion particles, acrylic emulsion particles, or a mixture of both.

12. The paper container of claim 11 wherein the base coat comprises emulsion particles.

13. The paper container of claim 11 wherein the primer coat further comprises a biocide additive.

14. The paper container of claim 10 wherein the primer coat and the base coat have different additives.

15. The paper container of claim 14 wherein the additives are selected from the group comprising: adhesion promoters, de-gassing additives, flow promoters, defoamers, colorants, stabilizers, biocides, wetting agents, surfactants, fillers, dispersants, plasticizers, and rheological additives.

16. The paper container of claim 15 wherein the base coat has additives comprising an anti-foaming agent, synthetic thickener, emulsion stabilizer, and a biocide.

17. The paper container of claim 16 wherein the aqueous-based, styrene-free, acrylate polymer top coat comprises a heterogeneous emulsion polymer particle dispersion having additives selected from the group comprising: adhesion promoters, de-gassing additives, flow promoters, defoamers, colorants, stabilizers, biocides, wetting agents, surfactants, fillers, dispersants, plasticizers, and rheological additives.

18. The paper container of claim 17 wherein the heterogeneous emulsion polymer particles of the aqueous-based, styrene-free, acrylate polymer top coat have a core and a shell.

19. The paper container of claim 18 wherein the core and the shell have different glass transition temperatures.

20. The paper container of claim 19 wherein particles of the aqueous-based, styrene-free, acrylate polymer barrier layer have a different glass transition temperature than the core and the shell of the aqueous-based, styrene-free, acrylate polymer top coat.

21. The paper container of claim 1 wherein the paper container is styrene-free.

22. A paper container comprising:

a paper sleeve having an inner surface and an outer surface and comprising:

overlapping side edges defining a sidewall seam;

a top portion defining a top opening;

a bottom portion defining a bottom opening; and a side wall portion extending between the top portion and the bottom portion;

a paper bottom, affixed to the bottom portion and closing the bottom opening, and having an inner surface and an outer surface;

a first multi-layer, styrene-free, acrylate polymer coating applied to an entirety of the inner surface of the paper sleeve to form a first barrier layer; and a second multi-layer, styrene-free, acrylate polymer acrylic-coating applied to an entirety of the inner surface of the paper bottom to form a second barrier layer;

wherein the first and second multi-layer, styrene-free, acrylate polymer coatings have different layers.

23. The paper container of claim 22 wherein the first multi-layer, styrene-free, acrylate polymer coating comprises a first primer coat confronting the inner surface of the paper sleeve, a first base coat confronting the first primer coat, and a first top coat confronting the first base coat.

24. The paper container of claim 23 wherein the second multi-layer, styrene-free, acrylate polymer coating comprises a second primer coat confronting the inner surface of the paper bottom and a second top coat confronting the second primer coat.

25. The paper container of claim 24 wherein the first and second top coats have the same chemical formulation.

26. The paper container of claim 25 wherein the first and second primer coats have the same chemical formulation.

27. The paper container of claim 25 wherein the first and second primer coats have different chemical formulations.

28. The paper container of claim 23 wherein the first base coat has additives comprising an anti-foaming agent, synthetic thickener, emulsion stabilizer, and a biocide.

29. The paper container of claim 28 wherein the first top coat comprises a heterogeneous emulsion polymer particle dispersion having additives comprising an anti-foaming agent, thickener, emulsion stabilizer, biocide, and fibrillated cellulose.

30. The paper container of claim 29 wherein the heterogeneous emulsion polymer particles of the first top coat have a core and a shell.

31. The paper container of claim 30 wherein the core and shell have different glass transition temperatures.

32. The paper container of claim 31 wherein at least one of the first primer coat and the first base coat comprise homogenous emulsion particles having a different glass transition temperature than the core and the shell of the top coat.

33. The paper container of claim 22 wherein the second multi-layer, styrene-free, acrylate polymer coating is applied to the outer surface of the paper bottom.

34. The paper container of claim 33 wherein the first multi-layer, styrene-free, acrylate polymer coating is applied to the outer surface of the paper sleeve.

35. The paper container of claim 22 wherein the first multi-layer, styrene-free, acrylate polymer coating adheres the overlapping side edges of the sidewall seam.

36. The paper container of claim 35 wherein no additional adhesive adheres the overlapping side edges of the sidewall seam.

37. A method of making the paper container of claim 22, the method comprising:

wrapping a paper sleeve blank around a paper bottom blank, to form a bottom seam between the paper sleeve blank and the paper bottom blank, and overlapping side edges of the paper sleeve blank to form the sidewall seam, with an entirety of an inner surface of the paper sleeve blank having a first multi-layer, styrene-free, acrylate polymer coating, and an entirety of an inner surface of the paper bottom blank having a second multi-layer, styrene-free, acrylate polymer coating; and applying at least pressure to at least the sidewall seam without the addition of an adhesive separate from the first multi-layer, styrene-free, acrylate polymer coating to bond the overlapping side edges at the sidewall seam.

38. The method of claim 37 further comprising applying pressure and heat to at least the sidewall seam.

39. The method of claim 38 further comprising applying at least one of pressure and heat to the bottom seam without the addition of an adhesive separate from the first and second multi-layer, styrene-free, acrylate polymer coating to bond the paper sleeve blank to the paper bottom blank at the bottom seam.

40. The method of claim 39 wherein the first multi-layer, styrene-free, acrylate polymer coating is different from the second multi-layer, styrene-free, acrylate polymer coating.

41. The method of claim 40 wherein the first multi-layer, styrene-free, acrylate polymer coating comprises a first primer coat confronting the inner surface of the sleeve, a first base coat confronting the first primer coat, and a first top coat confronting the first base coat.

42. The method of claim 41 wherein the second multi-layer, styrene-free, acrylate polymer coating comprises a second primer coat confronting the inner surface of the paper bottom and a second top coat confronting the second primer coat.

43. The method of claim 42 wherein the first and second top coats have the same chemical formulation.

44. The method of claim 42 wherein the first and second primer coats have the same chemical formulation.

45. The method of claim 42 wherein at least one of the first and second primer coats comprises homogenous emulsion particles with additives comprising polyvinyl alcohol and biocide.

46. The method of claim 45 wherein at least one of the first and second top coats comprises a heterogeneous emulsion polymer particle dispersion comprising additives comprising an anti-foaming agent, thickener, emulsion stabilizer, biocide, and fibrillated cellulose.

47. The method of claim 42 wherein the first multi-layer, styrene-free, acrylate polymer coating comprises a third base coat confronting the first top coat and a third top coat confronting the third base coat.

48. The method of claim 47 wherein the third base coat and the third top coat are only applied at, at least one of, the sidewall seam or the bottom seam.

49. The method of claim 48 further comprising cutting the paper sleeve blank from a web.

50. The method of claim 49 wherein the web is pre-coated with the first primer coat, the first base coat, and the first top coat.

51. The method of claim 50 wherein the third base coat and the third top coat are printed onto the web prior to the cutting of the paper sleeve blank.

52. The paper container of claim 22 wherein the paper container is styrene-free.

53. A paper container comprising:

a paper sleeve having an inner surface and an outer surface and comprising:

overlapping side edges defining a sidewall seam;

a top portion defining a top opening;

a bottom portion defining a bottom opening; and a side wall portion extending between the top portion and the bottom portion;

a paper bottom, affixed to the bottom portion and closing the bottom opening, and having an inner surface and an outer surface; and a multi-layer, aqueous-based, styrene-free, acrylic coating applied to an entirety of the inner surface of at least the paper sleeve, the multi-layer, aqueous-based, styrene-free, acrylate polymer coating consisting essentially of:

an aqueous-based, styrene-free, acrylate polymer barrier layer confronting the inner surface of at least the paper sleeve; and an aqueous-based, styrene-free, acrylate polymer top coat confronting the aqueous-based, styrene-free, acrylate polymer barrier layer.

* * * * *